US007136947B1

(12) United States Patent
Passerone et al.

(10) Patent No.: US 7,136,947 B1
(45) Date of Patent: Nov. 14, 2006

(54) SYSTEM AND METHOD FOR AUTOMATICALLY SYNTHESIZING INTERFACES BETWEEN INCOMPATIBLE PROTOCOLS

(75) Inventors: Roberto Passerone, Berkeley, CA (US); James A. Rowson, Fremont, CA (US); Alberto Sangiovanni-Vincentelli, Berkeley, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/330,231

(22) Filed: Jun. 10, 1999

(51) Int. Cl.
*G06F 13/00* (2006.01)

(52) U.S. Cl. .................. 710/100; 710/305; 710/315; 716/3

(58) Field of Classification Search .............. 710/315, 710/105, 305, 100; 327/7; 703/25; 712/34; 709/250; 326/37; 716/3
See application file for complete search history.

(56) References Cited

U.S. PATENT DOCUMENTS

| | | | | |
|---|---|---|---|---|
| 5,327,544 | A * | 7/1994 | Lee et al. ................. | 716/18 |
| 5,450,598 | A * | 9/1995 | Kaplan et al. ............ | 715/533 |
| 5,663,666 | A * | 9/1997 | Chu et al. .................. | 327/7 |
| 5,680,552 | A * | 10/1997 | Netravali et al. .......... | 709/250 |
| 5,845,107 | A * | 12/1998 | Fisch et al. ............... | 710/315 |
| 5,862,251 | A * | 1/1999 | Al-Karmi et al. .......... | 382/186 |
| 6,018,736 | A * | 1/2000 | Gilai et al. ................ | 707/6 |
| 6,223,274 | B1 * | 4/2001 | Catthoor et al. ........... | 712/34 |
| 6,308,147 | B1 * | 10/2001 | Keaveny ................... | 703/25 |
| 6,715,107 | B1 * | 3/2004 | Beer et al. ................. | 714/37 |

OTHER PUBLICATIONS

Chapman, Matt, The Finite State Machine Explorer, 1996, htp://www.belgarath, demon.co.uk/java/fsme.html.*
National Institute of Standards and Technology (NIST), http://www.nist.gov.*
Network Innovation Laboratories, Register Transfer Level Design, 1998, http://www.onlab/ntt.co.jp/member/imlig/sem98/tuthtm/node6.htm.*
H.H.Ehrenburg and H.A.N. van Maanen, A finite Automaton learning system using genetic programming, 1994, CWI Centrum Voor Wiskunde en Informatica Report Rapport.*
Jerry M. Rosenberg, Computers, Information Processing & Telecommunications, 1983, John Wiley & Sons, Inc. 2nd Ed., p. 480.*
Andrew S Tanenbaum, Structured Computer Organization, 1990, Prentice-Hall, Inc., 3rd Ed., pp. 11-13.*
Young, James Shin, Synchronization of Java Threads Using Rendezvous, 1997, http://www-cad.eecs.berkeley.edu/~jimy/java/rendezvous.*
Cohen, Daniel I.A., Introduction to Computer Theory, 1997, John Wiley & Sons, 2nd Edition, chapter 6.*

(Continued)

*Primary Examiner*—John R. Cottingham
*Assistant Examiner*—Justin King
(74) *Attorney, Agent, or Firm*—Bingham McCutchen LLP

(57) ABSTRACT

A system and method for enabling Intellectual Property (IP) Blocks to be reused at a system level. The present invention represents the IP blocks as blocks that exchange messages without needing to represent the functionality of the IP blocks. The implementations of these IP blocks exchanges messages through complex signaling protocols. In conventional systems, interfacing between IP blocks that use different signaling protocols is a tedious and error prone design task. The present invention uses regular expression based protocol descriptions to show how to map the message onto a signaling protocol. Given two protocols, the present invention builds an interface machine that automatically labels data referenced by all protocols. The present invention is capable of generating the interface even when the data sequencing of the two protocols differs.

39 Claims, 9 Drawing Sheets

OTHER PUBLICATIONS

Marc Bumble, Lee Coraor, Architecture for a Non-Deterministic Simulation Machine, 1998, Computer Science and Engineering, The Pennsylvania State University, p. 1600.*

T. Funkhouser, COS 126 lecture: Formal Languages, Spring 1999, http://www.cs.princeton.edu/courses/archive/spr99/cs126/comments/16homsky.html.*

Morris Mano, "Computer System Architecture", 1982, Prentice-Hall, Inc., 2$^{nd}$ Ed., pp. 440-441.*

Wikipedia, "Finite State Machine", Wikipedia, http://www.fact-index.com/f/fi/finite_state_machine.html.*

Lam, S.S., "Protocol Conversion", Mar. 1988, Software Engineering, IEEE Transactions on , vol. 14 , Issue: 3 , pp. 353-362.*

Yao, Y.-W.; Chen, W.-S.; Liu, M.T.; "A Modular approach to constructing Protocol Converters", Jun. 1990, INFOCOM '90. Ninth Annual Joint Conference of the IEEE Computer and Communication Societies, pp. 572-579.*

Ville Laurikari, "NFAs with Tagged Transitions, their Conversions to Deterministic Automata and Application to Regular Expressions", 2000, IEEE, SPIRE 2000, Proceedings. international Symposium on Sep. 27-29, 2000 pp. 181-187.*

Stephen A Fenner et al., "Inverting Onto Functions", 1996, IEEE, 11th Annual IEEE Conferrence, May 24-27, 1996, pp. 213-222.*

Answer.Com, definitions for "nondeterministic finite state machine" and "IP block".*

Wikipedia, definition for "Finite State Machine".*

Aho, A. V. et al. "Compilers Principles, Techniques and Tools," *Addison-Wesley*, pp. 83, 94-98, 107, 113, 121-125, 129, 135-141, 148, 172-173, 268-269, Reading, MA, 1988.

Akella, J. et al. "Synthesizing converters between finite state protocols," *Proceedings of the International Conference on Computer Design*, pp. 410-413, Cambridge, MA, Oct. 15-15, 1991.

Alfaro, L., et al. "Interface Theories for Component-based Design," University of California, Santa Cruz, *University of California, Berkeley*, (EMSOFT), 2001 (19 pp).

Alfaro, L., et al. "Interface Automata," *Dept. of Electrical Engineering and Computer Sciences, University of California, Berkeley*, (FSE), 2001 (17 pp).

Borriello, G. "A new Interface Specification Methodology and its Applications to Transducer Synthesis," *Ph.D. thesis, University of California at Berkeley*, pp. 116-136, Berkeley, CA, 1988.

Borriello, G. et al. "Synthesis and optimization of interface transducer logic," *Proceedings of the International Conference on Computer Aided Design*, pp. 274-277, Nov. 1987.

Brzozowski, J. A.. "Derivatives of regular expressions," *Journal of the Association for Computing Machinery*, 11(4): pp. 481-494, Oct. 1964.

Burch, J.R., et al. "Modeling Hierarchical Combinational Circuits" *IEEE1063-6757/93* pp. 612-617 1993.

Coelho, C. N. et al. "Analysis and synthesis of concurrent digital circuits using control-flow expressions," *IEEE Transactions on Computer-Aided Design of Integrated Circuits and Systems*, 15(8): pp. 854-876, Aug. 1996.

Filo, D. et al. "Interface Optimization for Concurrent Systems Under Timing Constraints," *1 IEEE Transactions on VLSI Systems*, pp. 172-185 (Sep. 1993).

Hopcroft, J. E. et al. "Introduction to Automata Theory, Languages, and Computation," *Addison Wesley*, pp. 19-46, 217-220, 250-253, Reading, MA, 1986.

Narayan, S. et al. "Interfacing Incompatible protocols using interface process generation," *Proceedings of the 32$^{nd}$Design Automation Conference*, pp. 468-473, San Francisco, CA, Jun. 12-16, 1995.

Öberg, J. et al. "Grammar-based hardware synthesis of data communication protocols," *Proceedings of the 9$^{th}$ International Symposium on System Synthesis*, pp. 14-19, La Jolla, CA, Nov. 5-8, 1996.

Passerone, R. "Automatic Synthesis of Interfaces between Incompatible Protocols," M.S. Thesis, University of California at Berkeley, 1997.

Passerone, R., et al. "Convertibility Verification and Converter Synthesis: Two Faces of the Same Coin," Cadence Berkeley Laboratories; University of California, Santa Cruz; University of California, Berkeley. 2002.

Rowson, J. A. et al. "Interface-based design," *Proceedings of the 34$^{th}$Design Automation Conference*, pp. 178-183, Anaheim, CA, Jun. 9-13, 1997.

Seawright, A. et al. "Clairvoyant: A synthesis system for production-based specification," *IEEE Transactions on VLSI Systems*, 2: pp. 172-185, Jun. 1994.

Sun, J. S. et al. "Design of system interface modules," *Proceedings of International Conference on Computer Aided Design*, pp. 478-481, 1992.

* cited by examiner

```
1:   explore( state ) {
2:       If ( state is on stack ) {
3:           retarget transition
4:           return ImmediateLoop
5:       }
6:
7:       If ( state is inconsistent )
8:           return Fail
9:       If ( state is already in the automaton ) {
10:          retarget transition
11:          return previous result
12:      }
13:      If ( state is in the pool )
14:          return Fail
15:      If ( state is final )
16:          return Success, 0
17:      // Begin new exploration
18:      Push state on the stack
19:      For all pairs of outgoing transitions {
20:          Compute new state
21:          Compute new bitset
22:          explore( new state )
23:          Save exploration result
24:      }
25:      Pop state from the stack
26:      Choose among non deterministic transitions
27:      Compute the exploration result
28:      Update the data structures
29:      return exploration result
30:  }
```

Figure 5

SYSTEM AND METHOD FOR AUTOMATICALLY SYNTHESIZING INTERFACES BETWEEN INCOMPATIBLE PROTOCOLS

BACKGROUND OF THE INVENTION

1. Field of the Invention

The present invention is related to the field of electronic design automation (EDA) and more particularly to the field of interface synthesis for intellectual property (IP) blocks.

2. Description of Background Art

As time to market pressures and product complexities climb, the pressure to reuse complex building blocks (also known as Intellectual Property, or IP) also increases. Today, most IP is available only at the register transfer level (RTL). This is problematic because of verification speeds and the variety of signaling conventions used for interfacing between IP blocks.

The present invention addresses the problem of synthesizing interfaces between communicating IPs that use different signaling conventions. For this problem, a description of the entire behavior of the IP is not only cumbersome, but introduces unnecessary details that may hamper the design process. An interface-based design process that attempts to separate the communication from the behavior for IP is described in J. A. Rowson and A. L. Sangiovanni-Vincentelli, *Interface Based Design*, Proceedings of the 34$^{th}$ Design Automaton Conference, 178–183 (Jun. 9–13, 1997) which is incorporated by reference herein in its entirety. To separate the communication aspect of the IP blocks from their behavior, the blocks must be abstracted to a transaction or messaging level. With abstracted communication, improvement in simulation performance was shown with a simulator named Cheetah. However, the abstraction level that is appropriate for fast simulation is not efficient for implementation.

One problem is that given two communicating design actors exchanging data, e.g., IP blocks, and a description of the two protocols that each one of the IP blocks uses to transfer the data, an interface needs to be generated that ensures that data transfers are consistent between the two protocols.

Some conventional systems have attempted to address the problem of interface synthesis. One such conventional system is described in G. Borriello, *A New Interface Specification Methodology and its Applications to Transducer Synthesis*, Ph.D. Thesis, University of California at Berkeley, Berkeley Calif. (1988) and G. Borriello and R. H. Katz, *Synthesis and Optimization of Interface Transducer Logic*, Proceeding of the International Conference on Computer Aided Design (November 1987), which are both incorporated by reference herein in their entirety (together referred to as "Borriello". Borriello introduces an "event graph" to establish synchronization between the two protocols and data sequencing. One limitation of this approach is that before attempting to make the two protocols compatible, a user must manually assign labels to the data referenced by each protocol, because the specification of the protocols is given at a very low level of abstraction using waveforms.

A second conventional system is described in J. S. Sun and R. W. Brodersen, *Design of System Interface Modules*, Proceeding of International Conference on Computer Aided Design, 478–481 (1992) which is incorporated by reference herein in its entirety. This second system extends the Borriello approach by providing a library of components. Each component in the library must still be manually entered into the library. Accordingly, even in this second system the user must still consider lower level details.

A third approach is described in S. Narayan and D. D. Gajski, *Interfacing Incompatible Protocols Using Interface Process Generation*, Proceedings of the 32$^{nd}$ Design Automation Conference, 448–473 (Jun. 12–16, 1995) which is incorporated by reference herein in its entirety. In this approach the protocol specification is first reduced to the combination of five basic operations (data read, data write, control read, control write, and time delay). Then the protocol description is broken into blocks (called relations) whose execution is guarded by a condition on one of the control wires or by a time delay. Next, the relations of the two protocols are matched into sets that transfer the same amount of data. Although this approach is able to account for data width mismatch between the two modules, the procedural specification of the protocols makes it difficult to adapt different data sequencing.

Another conventional approach is described in J. Akella and K. McMillan, *Synthesizing Converters Between Finite State Protocols*, Proceedings of the International Conference on Computer Design, 410–413 (Oct. 14–15, 1991) which is incorporated by reference herein in its entirety. In this approach the protocols are described as two finite state machines (FSMs), while a third FSM represents the valid transfer of data. The product machine is taken and pruned of the invalid/useless states. One limitation in this conventional approach is that data width mismatch cannot be handled and that the designer must manually enter the intended behavior of the interface in the form of the third FSM (referred to as the C-machine).

What is needed is a system and method that overcomes the above identified limitations and: (1) automatically resolves the correspondence between data referenced by multiple protocols; and (2) generates an interface that can translate between different sequences of data without having to manually introduce the intended behavior of the interface process.

SUMMARY OF THE INVENTION

Referring to FIG. 1A, the invention is a system and method for enabling Intellectual Property Blocks (IP) Blocks 10 and 20 to be reused at a system level. The present invention represents the IP blocks 10 and 20 as blocks that exchange messages without needing to represent the functionality of the IP blocks 10 and 20. The implementations of these IP blocks 10 and 12 exchanges messages through complex signaling protocols 12 and 22. In conventional systems, interfacing between IP blocks that use different signaling protocols is a tedious and error prone design task. The present invention uses regular expression based protocol descriptions to map the messages onto a signaling protocol. Given the two protocols 12 and 22, the present invention uses an interface generator 118 and builds an interface machine 30 that automatically labels data reference by all protocols. The present invention is also capable of generating the interface 30 even when the data sequencing of the two protocols 12 and 22 differs.

BRIEF DESCRIPTION OF THE DRAWINGS

FIG. 5 is a listing of pseudo-code corresponding to a more detailed description of the process of product computation and the process of resolving non-determinism according to the preferred embodiment of the present invention.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1A:
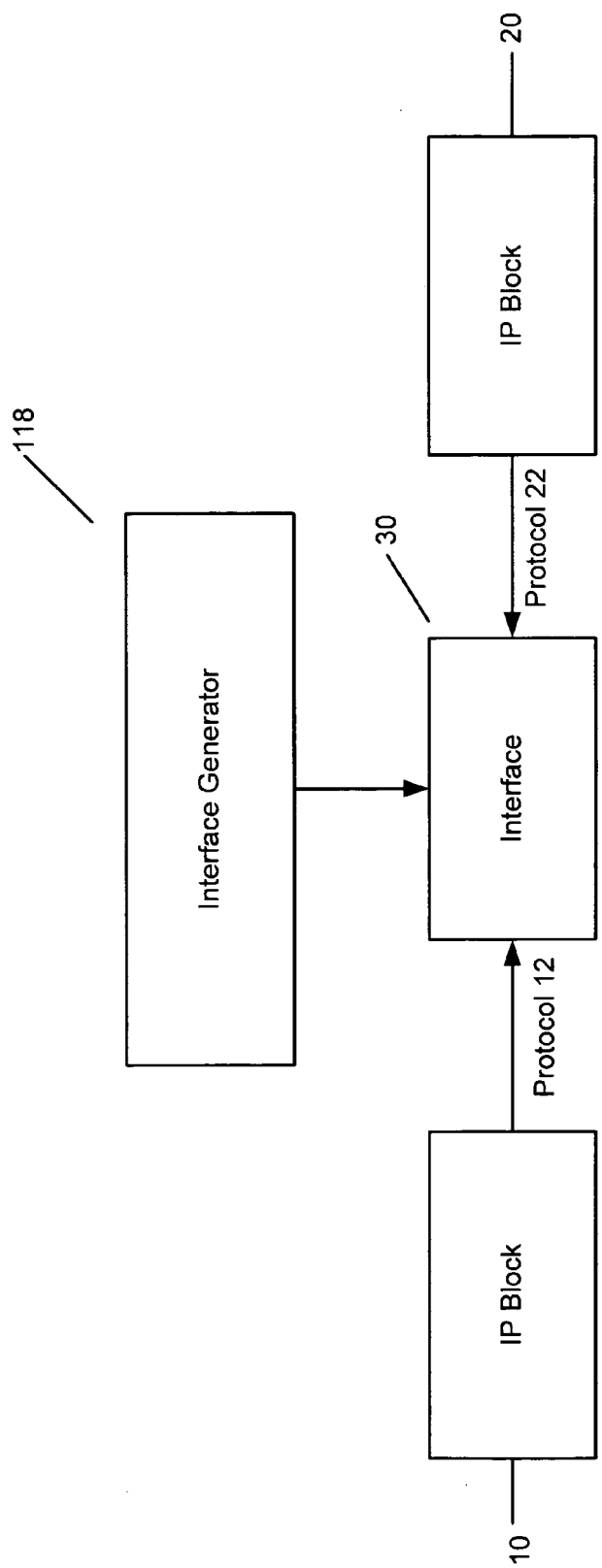
FIG. 1A is an illustration of IP blocks having different signaling protocols and an interface generated for communication between IP blocks according to one embodiment.
Figure 1B:
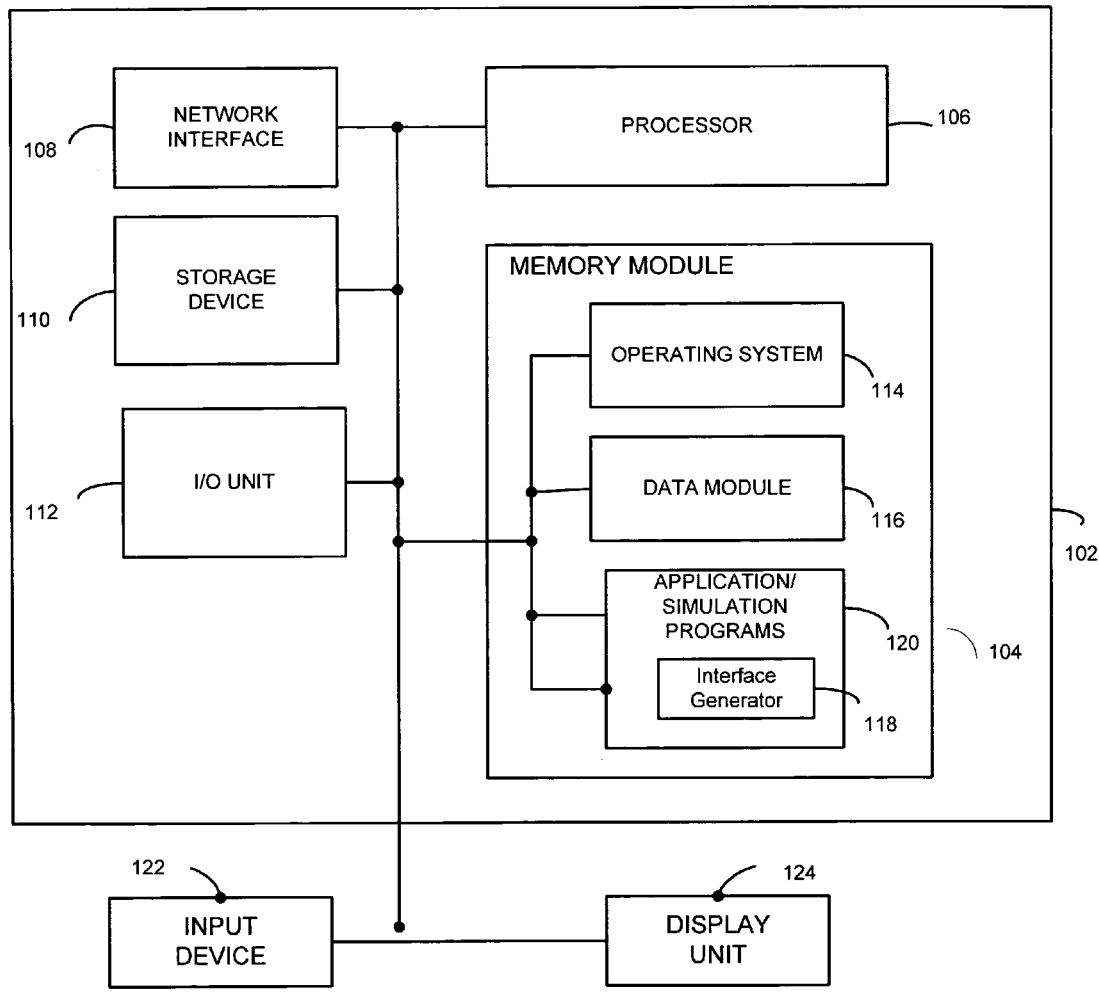
FIG. 1B is an illustration of a computer environment in which the preferred embodiment of the present invention may operate.

FIG. 1B is an illustration of a computer system in which the preferred embodiment of the present invention resides and operates. The computer system includes a conventional computer 102, such as a SPARC Station 10 that is commercially available from Sun Microsystems, Santa Clara, Calif. or an IBM compatible personal computer that is commercially available from IBM Corp., Armonk, N.Y., for example. The computer 102 includes a memory module 104, a processor 106, an optional network interface 108, a storage device 110, and an input/output (I/O) unit 112. In addition, an input device 122 and a display unit 124 can be coupled to the computer. The memory module 104 can be conventional random access memory (RAM) and can include a conventional operating system 114, a data module 116 for storing data and data structure generated by the present invention, and application programs 120, including an interface generator 118 (in which the present invention is stored and executed from in the preferred embodiment) and other simulation programs can be stored. Although the preferred embodiment of the present invention is described with respect to a circuit synthesis tool in a computer aided design (CAD) or electronic design automation (EDA) environment, it will be apparent to persons skilled in the art that the system and method of the present invention can be utilized in many different environments or types of circuit syntheses tools and circuit simulators, e.g., timing simulators, mixed signal simulators, logic simulators, etc., without departing from the scope of the present invention.

The processor 106 can be a conventional microprocessor, e.g., a Pentium III processor that is commercially available from Intel Corporation, Santa Clara, Calif. The optional network interface 108, the storage device 110, and the I/O unit are all conventional. The input device 122 can be a conventional keyboard that is commercially available from Hewlett Packard, Palo Alto, Calif., and/or a mouse, for example, that is commercially available from Logitech Incorporated, Freemont, Calif. The display unit 124 can be a conventional display monitor that is commercially available from IBM Corporation.

For clarity, the following description of the present invention does not describe the invention at the electronic signal manipulation level of detail. However, it will be apparent to persons skilled in the art that the steps such as storing a value, for example, correspond to manipulating a signal representing the value and storing the signal in the data module 116 or the storage device 110, for example. It will also be apparent to persons skilled in the art that the data module 116 and/or the application/simulation programs module 120 may be any type of memory or combinations thereof, for example, RAM and/or cache, can be stored in the directly in the data module 116 or can be stored in the storage device 110, e.g., a hard disk drive or any computer readable medium, for example.

Figure 2:
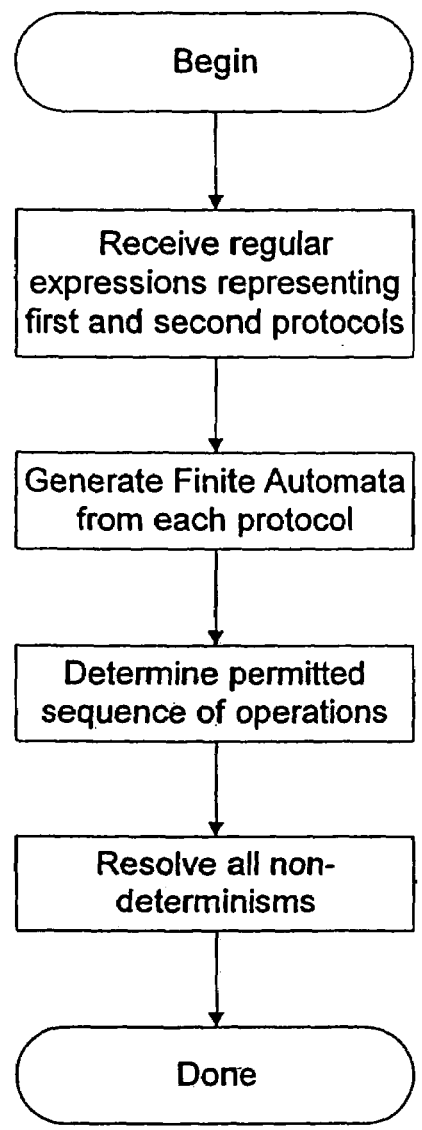
FIG. 2 is a flow chart describing the operation of the preferred embodiment of the present invention.

FIG. 2 is a flow chart describing the operation of the preferred embodiment of the present invention. As described above, the present invention generates an interface 30 between two protocols 12 and 22 of IP blocks 10 and 20. The present invention receives 202 regular expressions representing the first and second protocols 12 and 22. The following description is based upon generating an interface 30 between two protocols 12 and 22. Additional interfaces can be generated between additional protocols by repeatedly performing the following processes, for example. After receiving 202 the regular expressions, the present invention generates 204 finite automata from the regular expressions representing each protocol 12 and 22. Then the interface generator 118 determines 206 the permitted sequence of operations and resolves 208 all non-determinisms. Each of these steps is described in detail below.

As described above, the interface generator 118 receives 202 regular expressions representing each of the protocols. That is, the two protocols are described using regular expressions. One example of using regular expressions for describing hardware and for describing protocols is described in A. Seawright and F. Brewer, *Clairvoyant: A Synthesis System for Production-based Specification*, IEEE Transactions of VLSI Systems, 2:172–185 (June 1994), which is incorporated by reference herein in its entirety. This reference provides one example of a grammar-based specification that can be used in the present invention. One example of the use of grammar-based specification for the synthesis of hardware for data communication protocols is disclosed in J. Oberg, A. Kumar, and A. Hemani, *Grammar-based Hardware Synthesis of Data Communication Protocols*, Proceedings of the $9^{th}$ International Symposium on System Synthesis, 14–19 (Nov. 6–8, 1996) which is incorporated by reference herein in its entirety. In this reference the specific problem of interface synthesis is not addressed.

The use of derivatives of regular expressions is described in J. A. Brzozowski, *Derviatives of Regular Expressions*, Journal of the Association for Computing Machinery, 11(4): 481–494 (October 1964), and C. N. Coelho and G. D. Micheli, *Analysis and Synthesis of Concurrent Digital Circuits Using Control-flow Expressions*, IEEE Transactions on Computer-Aided Design of Integrated Circuits and Systems, 15(8):854–876 (August 1996) which are incorporated by reference herein in their entirety.

The present invention separates the communication aspect of the IP block and the behavioral aspect of the IP block. This single abstract model may represent many actual IP blocks that have different signaling conventions on their interfaces. The present invention synthesizes a machine to convert one protocol (convention) to another.

A protocol may be given regardless of its physical implementation. However, in order to simplify this description, the present invention presumes that the communication is point-to-point. That is, the communication media (the interface that will be synthesizes) is not shared with other modules in the system. The algorithm could however be used as a building block to a more general approach, as described above. The preferred embodiment of the present invention also presumes that the number of bits that are transmitted using a first protocol is the same as the number of bits that must be received using the second protocol. The present invention does not require that the sequence in which the bits are transmitted be the same as the sequence that the bits be received. In the preferred embodiment, the present invention temporarily stores part of the data in a conventional internal register. The internal register is long enough to store the entire data type. However, smaller or bigger registers can be used if a proper dataflow analysis shows that its size is big enough to hold all the data in transit. Alternatively, the interface may be implemented in software and the data may be stored in the memory module 104 or the storage device 110, for example.

One output of the present invention is a finite state machine and a data path that includes the internal register.

As described above, the input to the present invention is a description of the protocol used by the two modules using regular expressions. One description of how the protocols are represented by regular expressions is now set forth. In one embodiment of the present invention each module has a set of ports (data and control) over which the transfer occurs. One definition of a protocol is the legal sequences of values that may appear on the ports from the onset to the end of the data transfer.

If the ports are ordered in an arbitrary way, a symbol in the protocol can represent a tuple composed of the values on the ports listed in their order. In order to simplify the specification, ports that represent buses can be bundled together and assigned a single numerical value. Under this assumption, a protocol is a set of strings of symbols, or, in other words, a language in the alphabet of all the values that a symbol may assume. The present invention describes such a language with regular expressions—this way regular protocols may be used and a one to one correspondence can be established with finite state machines.

As mentioned above, symbols take values over the set of all possible tuples of values of the ports. If all the values that the data can take are included in the alphabet, then even very simple protocols would be expressed with exponentially growing regular expressions. For example, if a block has a connection to its environment with eight (8) wires transmitting a byte, then the protocol would be the set of all possible values over 8 wires, namely 256 different strings of 1 symbol. Since the interface generated by the present invention is independent of the value that the data takes, and is related to the control flow of the protocol, the present invention introduces a new symbol to the alphabet in the regular expression meaning any value. However, this by itself is not enough because in case of protocols where data is sequenced over a certain set of wires, e.g., a serial line, the interface must know what part of the data type is currently being transferred. Therefore the present invention also introduces a symbol meaning: any value the data type takes on a certain subset of its string of bits. For simplicity in parsing, the present invention only permits the specification of such a reference over intervals (possibly a single bit) on the string of bits representing the data type. For example, if a data type D is composed of 20 bits, the syntax D[10:5] is a reference to the value of the data type from bit 5 to bit 10. The occurrence of a reference in the protocol causes the interface to either store the value in the internal register or output the value previously stored in the internal register at the specified location.

In the preferred embodiment, information is represented as a text file. To ease the protocol specification, a token can be thought of as a typical composite data type, e.g., an array or a record structure composing other types. A wide variety of data types can be derived using this mechanism from some basic data type. In the preferred embodiment the basic data type consists of one bit of information, but other basic data types might be used. In the specification, the single parts of the token can be referenced using the name of the fields of its data type.

In the preferred embodiment the ports are listed with their direction and their data type. Since a protocol is independent of the direction of the transfer of data, the direction of the port is specified as either master or slave, the actual direction being resolved when the synthesis of the interface is requested. This ensures that an input device and an output device that use the same protocol share the same description.

Regular expressions can be expressed hierarchically using a regular Grammar as described in A. V. Aho, R. Sethi, and J. D. Ullman, *Compilers Principles, Techniques and Tools*, Addison-Wesley (1988) which is incorporated by reference herein in its entirety. In addition to its name, each rule of the grammar has a list of parameters whose value can be specified by the parent expression. In each rule, the references to values (as in D[10:5]) can be expressed in terms of the rules parameters which act as local variables. For the top level rule of the grammar, the only parameter is the token to be transferred so that, ultimately, all references are made with respect to the token in the preferred embodiment.

In a preferred embodiment, a symbol in the alphabet of the regular expression can be represented as a comma-separated list of values and references enclosed in braces, as in {0, 4, D[10:5]} for a 3 port specification. The number of values and their type match that of the port list for all rules, regardless of their level in the hierarchy of the specification.

Symbols and regular expressions can be composed using any combination of the standard operators, including "*" for Kleene closure (0 or more of the referenced symbol), "+" for semi-closure (1 or more), "|" for choice and a comma (",") for sequential expressions. In one embodiment, recursion is not used, except in the form of tail recursion when the Kleene closure operator is used.

Table 1 sets forth two examples illustrating how the token "yow" can be mapped to two different protocols.

TABLE 1

```
type byte bit[7:0];
type yow { byte a; byte b; }
protocol handshk of type yow {
    master bit trigger, byte bus
    term wait(bit t) { t, - }
    term get(bit t, byte b) { t, b }
    handshk(yow y) { wait(0)*,get(1,y.a)+,get(0,y.b)+ }
}
protocol serial of type yow {
    master bit start, byte bus;
    term null( ) { 0, - }
    term one(byte b) { 1, b }
    term two(byte b) { 0, b }
    serial(yow y) { null( )*,one(y.a),two(y.b)+ }
}
```

This second section of input code in table 1 defines a protocol "serial" for type "yow." The interface is defined as having two ports that can be used within the protocol, a pin named "start" and byte-wide bus named "bus." Both of these ports are driven by the master side of the interface. There are three sub-rules defined in the grammar: null, one, and two. Each of these patterns provides a value for all the ports, with "don't care" being represented by a dash ("-"). Parameters are listed with their data type after the name of the rule. The top level rule is a regular expression composition of calls to the terminal rules. In this case, null is expected 0 or more times (a Kleene closure), followed sequentially by a one with the a field of the yow token, followed by a two with the b field. As mentioned earlier, rules can be nested hierarchically so that serial could be used as a building block for more complex protocols. In this example the serial protocol waits for a value of one on the start pin with an associated byte on bus, followed immediately by a zero on the start pin and the other byte on bus.

The first section of input code in table 1 defines protocol "handshk" for type yow. Here, the protocol starts with trigger having a value of zero. Byte "a" is transferred when trigger transitions to a value of "1" and byte "b" is transferred when trigger transitions back to a value of zero. One difference with the previous protocol is that in "handshk" the time spent on the first byte is not known because the state where byte "a" is transferred can be traversed 1 or more times; on the other hand, for the "serial" protocol the time spent is specified as a single traversal of the corresponding state. In the first example the pin "start" identifies the start of the transfer, in the second example the change of value in "trigger" identifies the timing of the transfer of both the first and second bytes.

A result of this step of the present invention includes regular expressions representing the first and second protocols, e.g., handshk and serial. These regular expressions are received 202 by the interface generator 118 as described above.

As set forth earlier a goal of the present invention is to obtain a finite state machine (FSM) that when placed between the two modules implementing the specified protocols makes communication between the two modules (and protocols) possible. One problem is recognizing a given regular language on the producer side and generating a proper string contained in the other regular language on the other side. One problem with conventional systems is maintaining the same "meaning" (i.e. preserving the data contents of the message) while trying to optimize some parameters, e.g., transfer latency and the size of the storage in the interface process.

After receiving 202 the regular expressions, the present invention translates 204 the regular expressions into two automata that recognize the corresponding regular language. These two automata form the bulk of the interface. Then the product of the two automata is taken so that only the legal sequence of operations is retained 206, the signals are translated into inputs and outputs, and the non-determinism that arises is resolved 208 following one or more of the following rules: (1) never output a piece of data that has not yet been received; (2) complete the transfer of the data and reach the end of the transaction; (3) minimize (optimize) the latency.

Any remaining non determinism is broken using arbitrary choices based on the order the states are generated. In alternate embodiments other rules can be used to resolve non-determinisms. These procedures are now described in detail.

Figure 3:
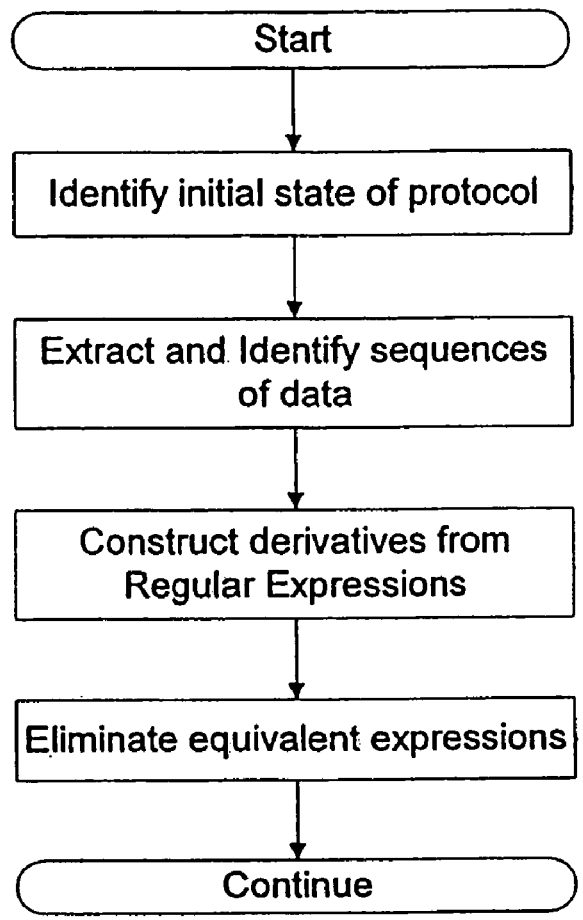
FIG. 3 is a flow chart having a more detailed description of the process of generating finite automata according to the preferred embodiment of the present invention.

FIG. 3 is a flow chart having a more detailed description of the process of generating 204 finite automata according to the preferred embodiment of the present invention.

To generate or translate the received regular expressions into finite automata the present invention modifies an approach using derivatives of regular expressions (as set forth in Brzozowski et al., referenced above). In contrast, other conventional systems teach the use of a different algorithm to build a non-deterministic automaton and then use the subsets construction to obtain the deterministic version. See, for example, J. E. Hopcroft and J. D. Ullman, *Introduction to Automata Theory, Languages, and Computation*, Addison-Wesley (1986), which is incorporated by reference herein in its entirety.

An advantage of the derivative approach used by the present invention is that at each step we know how far we are in the protocol transaction, since, in contrast to conventional systems, the present invention begins constructing the automaton from the initial state 302 rather than from some unspecified internal state. The present invention uses this feature to characterize each state with the amount of data that has been transferred along the ports. That is, the present invention extracts and identifies 304 sequences of data. This is done by collecting the information on the data that is transferred as transitions are added during the automaton construction. For each transition this information is integrated with that of previous transitions so that each state is provided with a history of the data that was previously transferred. This information is used during the construction of the product machine in step 206.

The present invention then constructs 306 derivatives based upon the regular expressions, as described below. The present invention then eliminates 308 equivalent expressions. As pointed out in Brzozowski et al., a challenge in computing derivatives is recognizing whether two regular expressions (two derivatives) represent the same language, even though they are expressed in different forms. In order to do that, the present invention represents the derivative of the regular expression with respect to a certain string as the set of symbols in the regular expression itself that may follow the given string. This can be obtained by first constructing a parse tree for the regular expression (where internal nodes represent operators and leaves represent symbols) and then traversing the tree beginning from the last symbol of the string that is being derived. Internal nodes may cause a different traversal depending on their nature. The following summarizes the different behaviors of the nodes:

Sequential operator: if traversing from the top of the tree, continue with the first child; if traversing from the first child continue with the second child; if traversing from the second child, continue towards the top.

Choice operator: if traversing from the top, continue by traversing both children; if traversing from either child, continue towards the top.

Kleene closure operator: always continue by traversing both the child and towards the top.

Semi-closure operator: if traversing from the top, continue with the child; if traversing from the child, continue by traversing both the child and the top.

In our representation, the check for equivalence is reduced to a check of equality between sets, since two identical sets of symbols represent the same derivative. However, the converse is not true (the same derivative could be represented by different sets), so that the complexity of the algorithm in the worst case scenario is exponentially related to the number of symbols in the regular expression (the same as the subsets construction), and the finite automaton that is obtained may not be minimum. However, in experiments for most practical cases, the state explosion has not been observed. Because of the way derivatives are represented, the present invention can factor any common term found at the beginning of the different branches of a choice operator, or detect the reconvergence after the choice was taken, thus following the style that many designers naturally employ when specifying a protocol. More details can be found in R. Passerone, *Automatic Synthesis of Interfaces Between Incompatible Protocols*, M. S. Thesis, University of California at Berkeley, (December 1997)(received by the University of California at Berkeley library on Jun. 22, 1998 and thereafter cataloged) which is incorporated by reference herein in its entirety.

While the finite automaton is constructed, the references to the fields of the data type of the token are expanded into references to the token in terms of the basic data type by following the hierarchy of the data type definition. Since this procedure is done for both protocols, a common factoring is established and the exact correspondence between parts of the token is resolved, even if the data types of the two protocols are structurally different.

Figure 4:
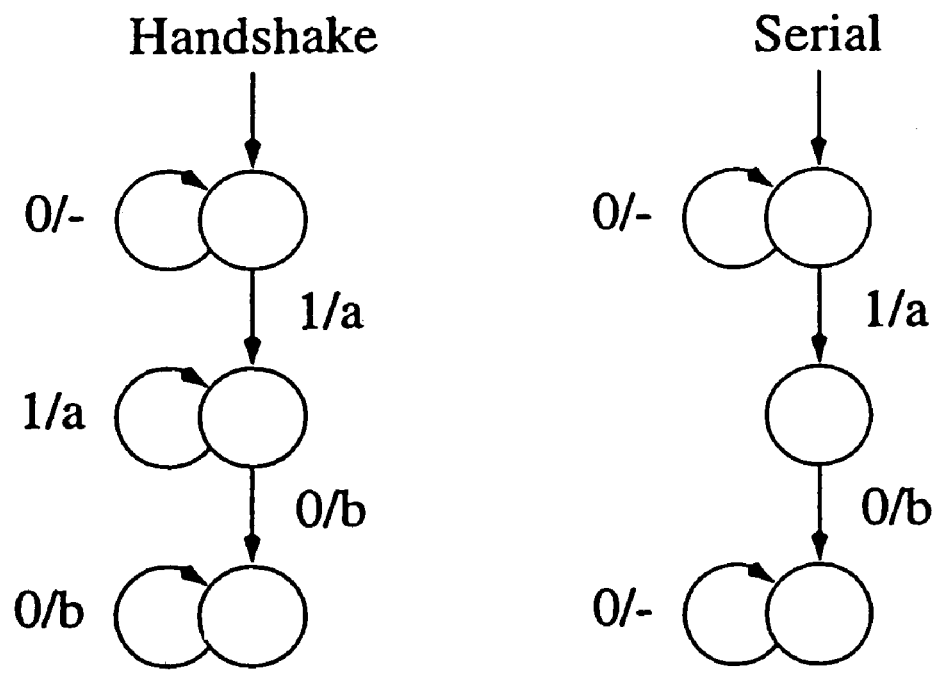
FIG. 4 is an example of the finite automata created according to the preferred embodiment of the present invention.

FIG. 4 is an example of the finite automata generated 204 by the present invention representing the two above protocols.

After generating 204 the finite automata, the interface generator 118 of the present invention determines 206 the permitted sequence of operations of the two protocols and resolves 208 all non-determinisms. The two generated 204 deterministic finite automata recognize a transaction on either side of the interface. The present invention then proceeds with the construction 206 of a subset of the product machine that performs the correct transfer of data. Moreover, the input/output nature of the signals is taken into account, so that a finite automation with output actions is created.

Another issue addressed by the present invention is non determinism. The present invention begins with two deterministic finite automata, so that the product is still a deterministic finite automaton. However, when signals are partitioned into inputs and outputs and a finite state machine is built, only the input set contributes to the condition on each arc, and therefore non determinism may arise (these machines are known as pseudo non deterministic, in that their corresponding finite automaton is deterministic).

If all possible pairs of states were included in the product machine, then the output side of the interface would be able to output data that in fact the input side had not yet received. This means that the product machine contains states that are not causally legal, and therefore should not be included. At the same time, there could be states that are perfectly legal, but that always lead to an illegal state—those too should not be included in the final machine. As a consequence, it may happen that the output of some piece of data must be delayed for many state transitions even though the data is already available in the registers of the interface. This effect can be explained considering that the interface is able to take decisions only in those states that contain some non deterministic transitions so that some condition can be added depending on the status of the transfer on the other side of the interface. These conditions can be automatically generated in the product machine by removing the illegal states and the corresponding transitions leading to them. Following a naming convention introduced in D. Filo, D. C. Ku, C. N. Coelho and G. De Micheli, *Interface Optimization for Concurrent Systems Under Timing Constraints*, 1 IEEE Transactions on VLSI Systems, 172–185 (September 1993), which is incorporated by reference herein in its entirety, states having non deterministic transitions are referred to as "anchor points."

Two approaches to construct the required subset of the product machine are: (1) start from nothing and add states, or (2) start from the entire product machine and remove the unwanted states. The preferred embodiment of the present invention follows the first approach although the second approach could be used in an alternate embodiment, and can be used with implicit enumeration techniques. The algorithm systematically explores all paths going from the initial state to the final states, removing those that are not permissible. Presently the exploration is done by explicitly enumerating the states, but implicit enumeration techniques can be used. Considering the way the present invention resolves non determinism, the product computation algorithm of the present invention always finds the correct interface between two protocols, if one exists. In addition, it always returns the minimum latency interface. A more formal proof of this feature is found in the R. Passerone thesis, referenced above.

The present invention uses a depth first recursive search implemented by a procedure called explore. FIG. 5 is a listing of pseudo-code corresponding to a more detailed description of the process of product computation and the process of resolving non-determinism, i.e., the "explore" process, according to the preferred embodiment of the present invention. The process is started by the creation of the initial pair of states and a call to its explore function. Three data structures are used to support the computation: a stack records all the states that have been visited along the path to the current state, used to detect loops in the product machine; a pool records all the states that were found to be illegal either because of data inconsistency or because they lead to data inconsistency (this data structure acts like a cache that prevents the algorithm from re-exploring paths that are already known to be inconsistent); states that are themselves legal but do not lead to a successful transaction, e.g., they only lead to a loop or deadlock condition, are also recorded here; an FSM is used to collect all the states that will eventually be part of the product machine.

The stack can be used to avoid endless computation. The present invention wants to explore all paths in the product machine, but does not want to loop through the inevitable cycles that are found in the state transition diagram. Re-exploring a loop does not provide any more information relating to the states in the loop so the present invention stops exploration of such states when they are detected.

For each pair of states, i.e. a state in the product machine, a pair of bitsets is used to record the amount of data that has been received and that has been sent, or has to be sent. These values are updated each time a transition is taken between two pairs of states, and is used to check the data consistency.

The explore function returns an object to the caller which may assume different symbolic values: "Success" means that the state will certainly lead to a successful transfer of the data and a companion number indicates the minimum number of transitions that it takes to get to the end of the transaction; "Fail" means that the state is either illegal or leads to an illegal state; "ImmediateLoop" indicates that the state has already been explored whereas "FutureLoop" that the state leads to a loop in one of its future transitions; "LoopSuccess" is returned when the state may either lead to a loop or to a successful transfer of the data (depending on the behavior of the outside environment).

In order to compute the return value, the explore operation of the present invention starts by checking on the stack or on the currently computed automaton if the state was already explored and returns with a loop indication to avoid multiple computations. Also the transition is retargeted to the state that was found. A return with a fail indication is also obtained in case the state is found to be inconsistent. In all other cases the state is pushed on the stack and for each pair of outgoing transitions the new state is created and explored (after updating the data consistency bitsets). The return value of each exploration is stored and the state is popped from the stack. At this point the transitions are analyzed and the non-determinism for the state is resolved. The final result is computed using the exploration result from all the transitions that survived the determinization. Since now all transitions are deterministic, a Fail in any of them will make explore return a Fail to the calling function even though other transitions from the same state lead to a successful transaction. This is because the process has no control over the transition that is taken once the state is reached. Therefore in order to ensure accuracy this state should not be reached. If there is no Fail, then either Success or LoopSuccess is returned with a number of state transitions equal to the minimum over all transitions plus 1 (to account for the present state).

Before returning, and if successful, the state is recorded in the FSM data structure along with its transitions. If unsuccessful, it is inserted in the failing pool.

A simple example will help illustrate the construction of the product machine. Consider the two protocols described above ("handshk" and "serial"). FIGS. 6(a)–(i) are illustrations of an example of the product computation process according to the preferred embodiment of the present invention.

In this example data is transferred from the handshk to the serial protocol. The product machine construction starts from the state corresponding to the pair of initial states (FIG. 6a) where the current state corresponds to the handshk-serial state pair identified by the darkened circles. Following that, all possible transitions are explored to see which ones should be included in the product.

Figure 6:
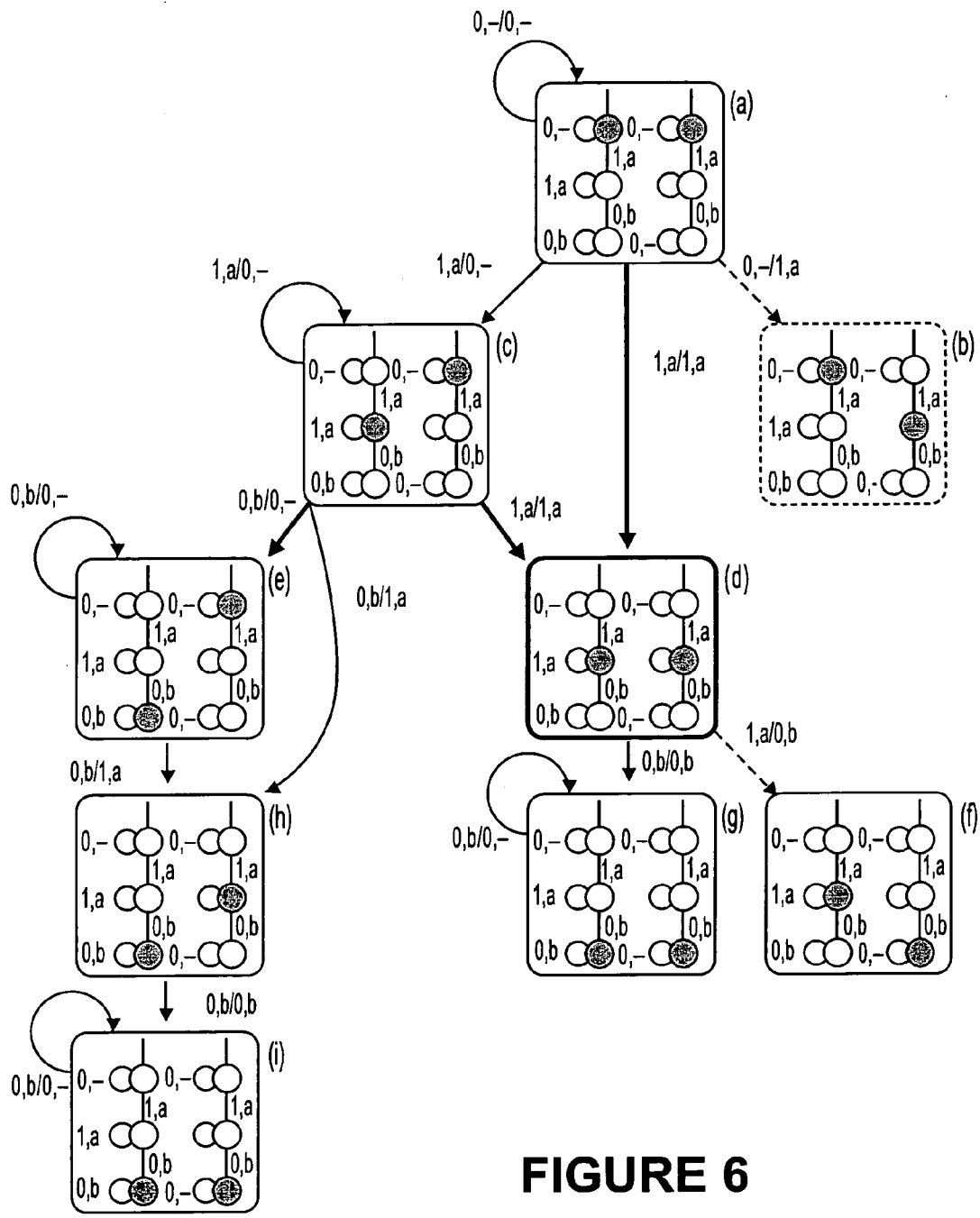
FIGS. 6(a)–(i) are illustrations of an example of the product computation process according to the preferred embodiment of the present invention.

From the initial state (FIG. 6a) the set of all possible transitions includes a loop to the initial state itself (when the inputs are 0,-/0,-; where the first set of inputs corresponds to the inputs to the handshake protocol and the second set of inputs represents the inputs to the serial protocol, and where "-" represents a don't care input) or a transition to a pair of states where either one of the two automata has advanced one position. If the inputs are (0,-/1,a) state (a) would transition to state (b) (FIG. 6b). State (b) is represented by a dashed line because it is a forbidden state. It is a forbidden state because the handshake protocol attempts to output data (byte "a"), but this byte has not yet been received by the handshake protocol. State (b) is therefore not included in the product machine and no additional exploration of state (b) is necessary.

If the inputs are (1,a/0,-) state (a) would transition to state (c) (FIG. 6c). State (c) is a permissible state since the first byte ("a") is received by the handshake protocol and nothing is output to the serial protocol.

Figure 7:
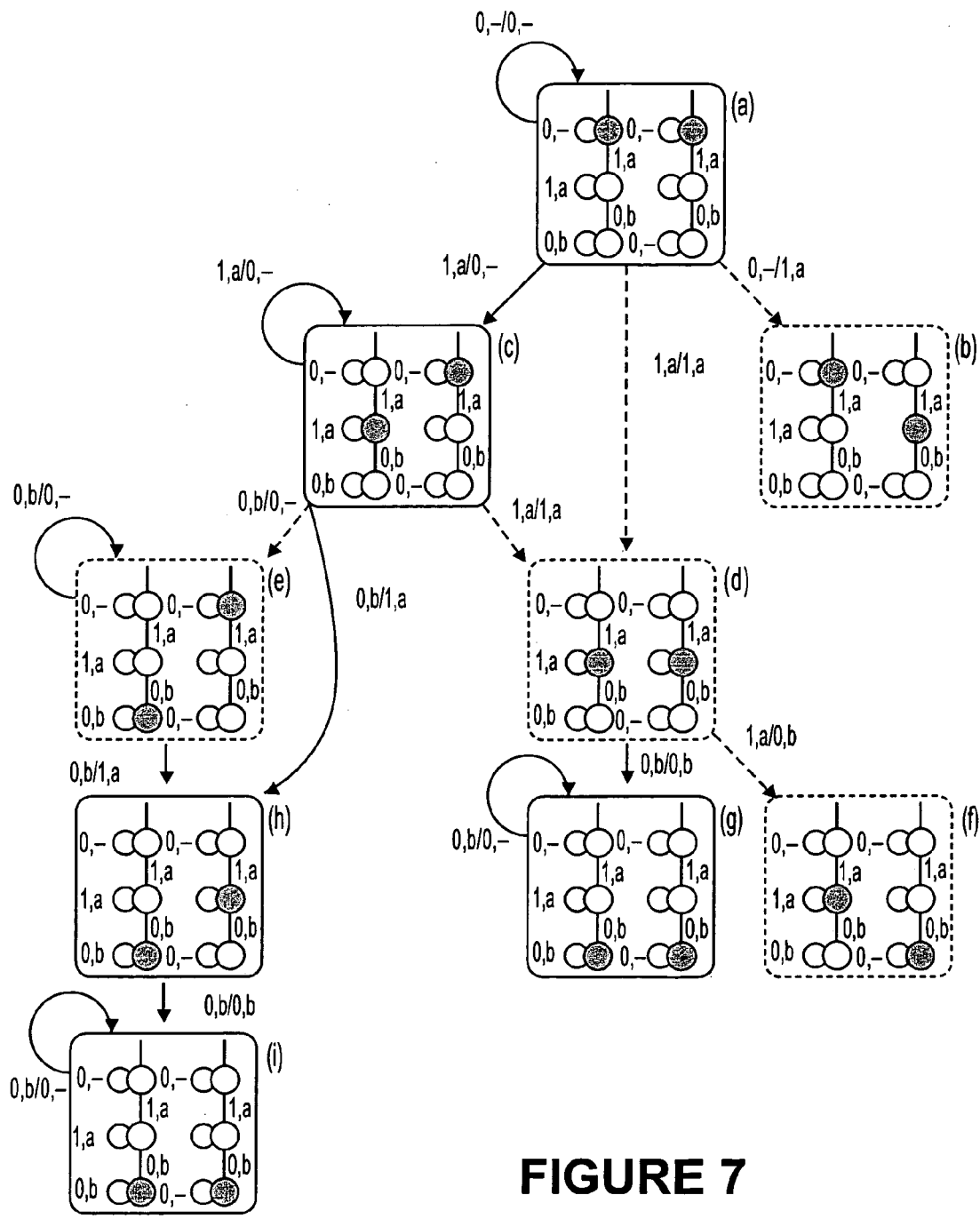
FIGS. 7(a)–(i) are illustrations of an example of the process of resolving non-determinism in the product computation process according to the preferred embodiment of the present invention.

State (d) (FIG. 6d) is transitioned to if while at state (c) the inputs (1,a/1,a) are received, or if while at state (a) the inputs (1,a/1,a) are received. State (d) is a permissible state because the data ("a") is received by the handshake protocol and is sent to the serial protocol. If, while in state (d), the inputs are (0,b/0,b) a transition to state (g) would occur (FIG. 6g). State (g) is a permissible state because the data ("b") is received by the handshake protocol and is sent to the serial protocol. If, while in state (d), the inputs are (1,a/0,b) a transition to state (f) would occur (FIG. 6f). State (f) is represented by a dashed line because it is also a forbidden state. It is a forbidden state because the handshake protocol attempts to output data (byte "b"), but this byte has not yet been received by the handshake protocol. State (f) is therefore not included in the product machine and no additional exploration of state (f) is necessary. The present invention then looks at the possible child states of state (d), i.e., state (g) and state (f). State (f) is a forbidden state, and since the data values received while at state (d) are not known beforehand and are controlled solely by the producer of the data, it is possible to transition from (d) to (f) (it occurs if the handshake protocol does not transmit byte "b" immediately after the interface reaches state (d)). Since this must be avoided in all cases to ensure the correct operation, the present invention identifies state (d) as being an illegal state. In FIG. 7, the dashed lines indicate that state (d) is identified as a forbidden state. State (d) could be saved in the construction only if a legal transition existed outgoing from (d) and with the same input label as the illegal transition, as that would be chosen during the process of resolving non-determinism, as will be described later.

State (e) (FIG. 6e) is transitioned to if while at state (c) the inputs (0,b/0,-) are received. State (e) is a permissible state because the data ("b") is received by the handshake protocol and nothing is sent to the serial protocol. State (h) (FIG. 6h) is transitioned to if while at state (c) the inputs (0,b/1,a) are received or if while at state (e), the inputs (0,b/1,a) are received. State (h) is a permissible state because the data ("a" and "b") has been received by the handshake protocol and byte "a" is sent to the serial protocol.

State (i) (FIG. 6i) is transitioned to if while at state (h) the inputs (0,b/0,b) are received. State (i) is a permissible state because the data ("b") has been received by the handshake protocol and is sent to the serial protocol. The resulting set of all permitted sequences includes state (a), state (c), state (d), state (e), state (g), state (h), and state (i).

While determining 206 all permitted sequences of operations using the above described product computation method, the present invention resolves 208 all non-determinisms. The present invention partitions the set of outgoing transitions into equivalence classes: each class is denoted by the same input label (e.g., the non deterministic transitions are grouped together). For each equivalence class, only one transition is chosen to be part of the final implementation. Here is where choices can be taken to resolve non determinism and to optimize performance. In the preferred embodiment, a transition whose exploration returned a Success or LoopSuccess is chosen over a Loop or a Fail. Ties between successful transitions are broken considering the number of state transitions that must be taken to reach the end of the transaction.

FIGS. 7(a)–(i) are illustrations of an example of the process of resolving non-determinism in the product computation process according to the preferred embodiment of the present invention. When at state (a), a non-determinism does not exist when an input of (0,-) is received by the handshake protocol because the state machine stays at state (a) since state (b) has already been eliminated. However, if the handshake protocol receives an input of (1,a) at state (a) then the state machine can proceed to either state (c) or state (d). Since state (d) was already found to be illegal, only the transition to (c) is retained in the final construction.

Similarly, when a (0,b) is received by the handshake protocol while at state (c) a non-determinism exists because the state machine can transition to either state (e) or state (h).

Since a stated objective is to minimize the latency of the system, state (e) is eliminated because it is an intermediate state to state (h).

When the last explore returns the FSM contains the product machine. Since states are added to the FSM starting from the last state (because of the recursive call), we may add states that are unreachable from the start state. A final clean up procedure takes care of removing all dangling states, e.g., state (g).

Figure 8:
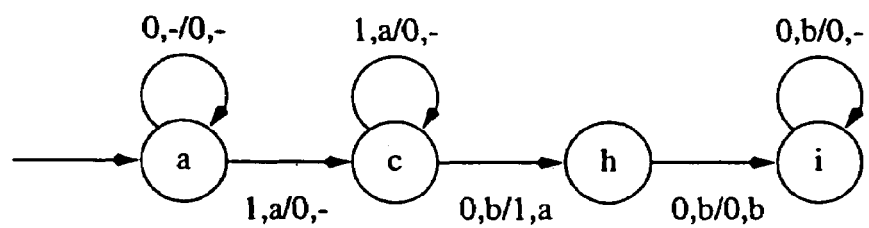
FIG. 8 is an illustration of a deterministic state machine generated according to the preferred embodiment of the present invention.

FIG. 8 is an illustration of a deterministic state machine generated according to the preferred embodiment of the present invention. The remaining states are state (a), state (c), state (h) and state (i). The resulting state machine is deterministic since at each state an input to the handshake protocol has only one possible transition.

Besides the generation of the interface, the present invention can also generate two modules that act as the producer and as the receiver of the data, respectively. To do this, the finite automata generated for each protocol in the above procedure are transformed into FSM's by separating the input ports from the output ports. As for the product machine, this may result in some non-determinism, which, in the preferred embodiment, is randomly resolved by choosing one of the many possible transitions that share the same input. The data values for the token are finally assigned at random. In alternate embodiments other rules can be used to resolve non-determinisms and to assign the values to the token. These machines are very valuable in order to verify in a test-bench that the functionality of the interface is correct by abstracting the behavior of the modules whose protocol had been described.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A method for exchanging data messages between a first Intellectual Property building block having a first signaling protocol for exchanging messages and a second Intellectual Property building block having a second signaling protocol for exchanging messages, the first signaling protocol including a data type having a first structure, the second signaling protocol including a data type having a second structure different than the first structure, the method comprising:
   receiving a first representation, representing the first signaling protocol of said first Intellectual Property building block, said first representation using regular expressions;
   receiving a second representation, representing the second signaling protocol of said second Intellectual Property building block, said second representation using regular expressions;
   generating a first finite automaton for said first representation;
   generating a second finite automaton for said second representation; and
   automatically synthesizing an interface between the structurally different first and second signaling protocols of the first and second Intellectual Property building blocks based on the first and second finite automatons, without manually entering the interface behavior.

2. The method of claim 1, further comprising:
   automatically corresponding data from said structurally different first and second protocols.

3. The method of claim 2, further comprising:
   automatically translating data between said first protocol to said second protocol, said data in said first protocol having a first sequence, said data in said second protocol having a second sequence that is different from said first sequence.

4. The method of claim 2, wherein said generating a first finite automaton comprises:
   identifying the initial state of the first protocol;
   identifying a first sequence of data according to the first protocol;
   constructing derivatives of regular expressions; and
   eliminating equivalent expressions.

5. The method of claim 4, wherein said identifying a first sequence of data comprises:
   collecting data that is transferred during one or more transitions; and
   integrating said data with previous transitions.

6. The method of claim 5, further comprising:
   automatically translating data between said first protocol to said second protocol, said data in said first protocol having the first sequence, said data in said second protocol having a second sequence that is different from said first sequence.

7. The method of claim 1, further comprising:
   automatically translating data between said first protocol to said second protocol, said data in said first protocol having a first sequence, said data in said second protocol having a second sequence that is different from said first sequence.

8. The method of claim 1, wherein said generating a first finite automaton comprises:
   identifying the initial state of the first protocol;
   identifying a first sequence of data according to the first protocol;
   constructing derivatives of regular expressions; and
   eliminating equivalent expressions.

9. The method of claim 1, further comprising separating communication aspects and behavioral aspects of the first and second Intellectual Property building blocks, thereby abstracting the respective first and second protocols.

10. The method of claim 1, the first and second Intellectual Property building blocks being reusable at a system level register transfer level.

11. The method of claim 1, wherein the interface can be automatically synthesized when data sequencing between the first and second signaling protocols differs.

12. The method of claim 1, wherein the interface automatically labels data referenced by the first and second signaling protocols.

13. The method of claim 1, wherein the interface is automatically synthesized between the first and second Intellectual Property building blocks within a computer.

14. A computer based system for exchanging data messages between a first Intellectual Property building block having a first signaling protocol for exchanging messages and a second Intellectual Property building block having a second signaling protocol for exchanging messages, the first signaling protocol including a data type having a first structure, the second signaling protocol including a data type having a second structure different than the first structure, the system comprising:
   a storage device to store data and sequences of operations;
   a processor to receive signals from said storage device and to execute said sequences of operations;
   a receiving unit to transmit signals to said processor and to receive a first and second representation, representing the first and second protocols of respective first and second Intellectual Property building blocks, said first and second representations using regular expressions;

an automata unit to generate a first finite automaton for said first representation and to generate a second finite automaton for said second representation; and a synthesizing unit to automatically synthesize an interface between the structurally different first and second signaling protocols of the first and second Intellectual Property building blocks based on the first and second finite automatons, without manually entering the interface behavior.

15. The system of claim 14, further comprising:
a corresponding unit to receive signals from said processor and to automatically correspond data from said first and said second protocol, wherein said first protocol and said second protocol are structurally different.

16. The system of claim 15, further comprising:
a translation unit to automatically translate data between said first protocol and said second protocol, said data in said first protocol having a first sequence, said data in said second protocol having a second sequence that is different from said first sequence.

17. The system of claim 15, wherein said automata unit comprises:
a first identifying unit to identify the initial state of the first protocol;
a second identifying unit to identify a first sequence of data according to the first protocol;
a derivative unit to construct derivatives of regular expressions; and
an eliminating unit to eliminate equivalent expressions.

18. The system of claim 17, wherein said second identifying unit comprises:
a data collection unit to collect data that is transferred as one or more transitions; and
a data analyzer to integrate said data with previous transitions.

19. The system of claim 14, further comprising:
a translation unit to automatically translate data between said first protocol and said second protocol, said data in said first protocol having a first sequence, said data in said second protocol having a second sequence that is different from said first sequence.

20. The system of claim 14, wherein the product unit comprises:
a selection unit to select an interface state representing a first finite automaton state and a second finite automaton state;
an identifying unit to identify outgoing transitions in said selected state; and
a state unit to determine a new state for each outgoing transition.

21. The system of claim 20, wherein the product unit further comprises:
a consistency unit to identify said permitted operations as operations that do not result in a data inconsistency.

22. The system of claim 14, further comprising separating communication aspects and behavioral aspects of the first and second Intellectual Property building blocks, thereby abstracting the respective first and second protocols.

23. The system of claim 14, the first and second Intellectual Property building blocks being reusable at a system level register transfer level.

24. The system of claim 14, wherein the interface can be automatically synthesized when data sequencing between the first and second signaling protocols differs.

25. The system of claim 14, wherein the interface automatically labels data referenced by the first and second signaling protocols.

26. The system of claim 14, wherein the interface is automatically synthesized between the first and second Intellectual Property building blocks within a computer.

27. A computer readable medium storing instructions which, when executed by a processing system, cause the system to perform a method for exchanging data messages between a first Intellectual Property building block having a first signaling protocol for exchanging messages and a second Intellectual Property building block having a second signaling protocol for exchanging messages, the method comprising:
receiving a first representation of the first signaling protocol of the first Intellectual Property building block;
receiving a second representation of the second signaling protocol of the second Intellectual Property building block;
generating a first finite automaton for said first representation;
generating a second finite automaton for said second representation;
automatically generating a third representation of one or more permitted operations of said first and second finite automata, without manually entering the third representation behavior; and
automatically eliminating non-determinisms in said third representation.

28. The method of claim 1, further comprising:
automatically generating a third representation, representing one or more permitted operations of said first and second finite automata.

29. The method of claim 28, wherein automatically generating a third representation comprises:
(a) selecting the interface state representing a first finite automaton state and a second finite automaton state;
(b) identifying all outgoing transitions in said selected state;
(c) determining a new state for each outgoing transition; and
(d) repeating steps (a)–(c) for each interface state.

30. The method of claim 29, wherein generating a third representation comprises:
identifying said permitted operations as operations that do not result in a data inconsistency.

31. The method of claim 29, further comprising:
identifying non-deterministic transitions for each interface state; and
selecting a single outgoing transition for each interface state for each input value based upon priority parameters to generate a deterministic interface between the first and second protocols.

32. The method of claim 27, further comprising separating communication aspects of the first and second Intellectual Property building blocks and the behavioral aspects of the first and second Intellectual Property building blocks, thereby abstracting the respective first and second protocols.

33. The method of claim 27, the first and second Intellectual Property building blocks being reusable at a system level register transfer level.

34. The method of claim 27, wherein the third representation can be automatically synthesized when data sequencing between the first and second signaling protocols differs.

35. The method of claim 27, wherein the third representation automatically labels data referenced by the first and second signaling protocols.

36. The method of claim 27, wherein the third representation is automatically synthesized between the first and second Intellectual Property building blocks within a computer.

37. A method for exchanging data messages between a first Intellectual Property building block having a first signaling protocol and a second Intellectual Property building block having a second signaling protocol, the method comprising:

generating a first finite automaton corresponding to the first signaling protocol of the first Intellectual Property building block;

generating a second finite automaton corresponding to the second signaling protocol of the second Intellectual Property building block;

automatically generating a representation of one or more permitted operations of the first and second finite automata; and automatically eliminating at least one non-determinism in the representation.

38. The method of claim 37, further comprising separating communication aspects and behavioral aspects of the first and second Intellectual Property building blocks, thereby abstracting the respective first and second protocols.

39. The method of claim 37, the first and second Intellectual Property building blocks being reusable at a system level register transfer level.

* * * * *